(12) United States Patent
Grabowski

(10) Patent No.: US 7,678,305 B2
(45) Date of Patent: Mar. 16, 2010

(54) METHOD OF PRE-APPLYING A BOLSTER ASSEMBLY TO AN INTERIOR TRIM PART

(75) Inventor: David Norbert Grabowski, Clarkston, MI (US)

(73) Assignee: Magna International Inc., Aurora (CA)

( * ) Notice: Subject to any disclaimer, the term of this patent is extended or adjusted under 35 U.S.C. 154(b) by 1208 days.

(21) Appl. No.: 10/503,162

(22) PCT Filed: Jan. 14, 2003

(86) PCT No.: PCT/US03/01045

§ 371 (c)(1),
(2), (4) Date: Jul. 5, 2005

(87) PCT Pub. No.: WO03/066304

PCT Pub. Date: Aug. 14, 2003

(65) Prior Publication Data

US 2006/0157881 A1      Jul. 20, 2006

Related U.S. Application Data

(60) Provisional application No. 60/353,435, filed on Feb. 1, 2002.

(51) Int. Cl.
*B29C 67/00* (2006.01)

(52) U.S. Cl. .............. 264/46.4; 264/248; 264/249; 264/295; 264/296; 264/339; 264/313; 425/517; 425/519; 425/520

(58) Field of Classification Search .............. 264/46.4, 264/295, 296, 313, 248, 249, 339; 425/517, 425/519, 520; 156/212, 214, 221
See application file for complete search history.

(56) References Cited

U.S. PATENT DOCUMENTS 5,082,609 A      1/1992   Hall et al.

(Continued)

FOREIGN PATENT DOCUMENTS

DE          3615498 A1      11/1987

(Continued)

*Primary Examiner*—Christina Johnson
*Assistant Examiner*—Magali P Théodore
(74) *Attorney, Agent, or Firm*—Honigman Miller Schwartz and Cohn LLP

(57) ABSTRACT

A method of pre-applying a bolster assembly to an interior trim part includes the steps of applying a base skin layer to a groove of a first nest, applying a bolster skin layer to a second nest, positioning the first nest in an open position, and inserting a leading edge of a bolster skin layer in the groove of the first nest when the first nest is in the open position until the bolster skin layer engages the base skin layer. The bolster assembly can be attached to the interior trim part by a Foam-In-Place (FIP) or Low-Pressure Molding (LPM) operation. The interior trim part may comprise a dashboard garnish, an instrument panel (IP), a door panel, and the like. A boss locating portion can be integrally formed within the base skin layer and is used for locating the bolster assembly on the interior trim piece during the manufacturing process. Because the bolster assembly is pre-applied to the interior trim part prior to the FIP or LPM operation, the bolster assembly can be positioned at the bottom-most portion of the groove to provide a consistent fit and finish, while reducing scrap material and cost of the interior trim part.

5 Claims, 4 Drawing Sheets

U.S. PATENT DOCUMENTS

| | | | |
|---|---|---|---|
| 5,531,499 A * | 7/1996 | Vecchio et al. | 296/146.7 |
| 5,648,109 A * | 7/1997 | Gutowski et al. | 425/504 |
| 5,885,662 A * | 3/1999 | Gardner, Jr. | 427/426 |
| 6,149,853 A * | 11/2000 | Luckett et al. | 264/266 |

FOREIGN PATENT DOCUMENTS

| | | |
|---|---|---|
| EP | 0275389 | 7/1988 |
| EP | 275389 A2 * | 7/1988 |

* cited by examiner

METHOD OF PRE-APPLYING A BOLSTER ASSEMBLY TO AN INTERIOR TRIM PART

TECHNICAL FIELD

The present invention relates to a bolster assembly for an interior trim part of a vehicle, and in particular to a bolster assembly formed by applying the bolster skin to an interior trim part, such as interior door panel, prior to performing a Foam-In-Place (FIP) or Low-Pressure Molding (LPM) operation.

BACKGROUND OF THE INVENTION

Conventional bolster assemblies normally employ a plurality of layers that are applied at once on a bolster region of interior trim parts of a vehicle, such as an interior door panel, during interior trim part manufacturing. When the bolster assembly is applied to the bolster region of the door panel, the bolster assembly is simultaneously cut as it is glued and pushed into a peripheral groove defining the bolster region. The cutting of the bolster assembly during the manufacturing process increases the amount of scrap material. In addition, if the above process not properly performed, the resulting bolster assembly is defective and the entire interior trim part incorporating the bolster assembly is scraped.

Conventional bolster assemblies may also come in the form of a hand-made "add-on" bolster assembly. The add-on bolster assembly normally includes a heavy substrate layer injection molded to a piece of die-cut foam. A cover skin is wrapped around the periphery of the heavy substrate and die-cut foam, which is then stapled together on the rear side of the bolster assembly. The add-on bolster assembly is then manually attached to an interior trim part by heatstaking, screwing, or by other fastening means, such as palnuts. The weight restrictions and tolerances of the interior trim part results in add-on bolster design restrictions because of the need for the heavy substrate layer. The add-on bolster assembly also is manufactured with a high cost to the manufacturer due to the intensive hand labor. Costs are also increased by the waste of the high amount of scrap material of the die cut foam, as well as the need for extra cover skin material for the stapling operation.

Current profile designs for interior trim parts, such as interior door panels, involve increasing variations in the topography of the door panel because of the varying slopes, surfaces, and grooves of the door panel design. One problem associated with the increasing variation in the topography is that the profile region where the bolster is attached to the groove prevents the bolster assembly from being fully positioned within the groove during the manufacture of the door panel. Another problem associated with conventional manufacturing methods is that relatively large amounts of scrap material are produced, thereby increasing the cost of the interior trim part. Yet another problem associated with conventional manufacturing methods is that consistently manufactured interior trim part is not ensured and the entire trim part is scraped in the event of a malfunction of the manufacturing process.

SUMMARY OF THE INVENTION

The inventor of the present invention has recognized these and other problems associated with conventional manufacturing methods for interior trim parts, such as an interior door panel. To this end, the inventor has developed a method for manufacturing an interior trim part, such as a door panel with an integrated bolster assembly that can be formed in a controlled and consistent fashion while reducing the amount of scrap material, weight, and costs during the manufacturing of the interior trim part.

Specifically, the bolster assembly of the invention comprises a flexible base layer, a bolster skin layer, and at least one boss-locating portion. The base layer has a surface defined by the slopes, surfaces, and grooves of the bolster region. The bolster skin conforms to the slopes, surfaces, and grooves of the flexible base layer and is adhesively affixed thereto. The boss-locating portion is integrally formed within the base layer for locating the bolster assembly on the interior trim piece.

The method of pre-apply a bolster assembly to an interior trim part comprises the steps of:
  applying a base skin layer to a groove of a first nest;
  applying a bolster skin layer to a second nest;
  positioning the first nest in an open position;
  inserting a leading edge of a bolster skin layer in the groove of the first nest when the first nest is in the open position until the bolster skin layer engages the base skin layer.

After inserting the bolster skin layer in the groove, the bolster skin layer is detached from the second nest, the first nest is positioned in a closed position, and the base skin layer is removed from the first nest. A Foam-In-Place (FIP or Low-Pressure Molding (LPM) operation can be performed after the base skin layer is removed from the first nest.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
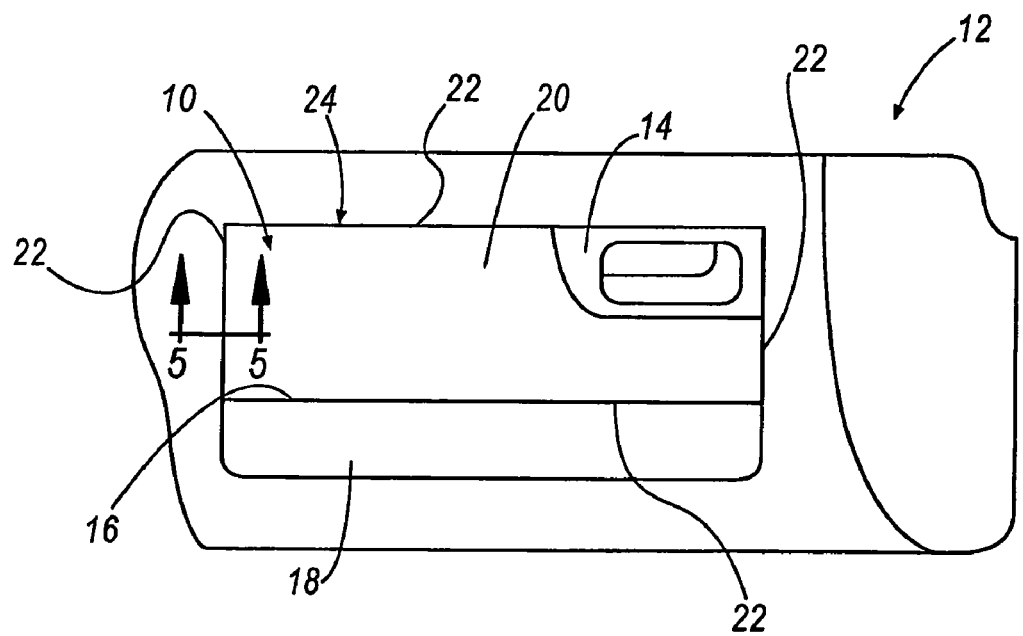
FIG. 1 is an elevational view of the interior trim part including a bolster assembly in accordance with the invention.

FIG. 1 shows a bolster assembly, shown generally at 10, that is attached to an interior trim part, such as a door panel assembly, shown generally at 12.

Typically, the bolster assembly 10 has a soft, plush-like feature that acts as decorative trim on the door panel assembly 12 that faces toward the passenger compartment area in a vehicle (not shown). Typically, the bolster assembly 10 has a thickness approximately equal to 1.5 mm. However, the thickness of the bolster assembly 10 may vary depending of the type of material used and the door panel assembly design. The bolster assembly 10 may be formed by any one or a combination of the following processes including injection-molding, material spraying, casting, male/female vacuum-forming, or the like. The door panel assembly 12 may also include a handle bezel portion 14, an armrest portion 16, and an additional armrest 18 that border the bolster assembly 10.

Preferably, the bolster assembly 10 comprises a flexible first layer, such as a base skin layer 26, and a flexible second layer, such as a bolster skin layer 20. The base skin layer 26 may comprise a sprayed urethane or any flexible or elastomeric material, such as Thermoplastic Olefin (TPO), or the like. The bolster skin layer 20 may comprise a decorative surface material such as a cloth, leather, or artificial leather. It will be appreciated that the invention is not limited to the type of material used for the bolster assembly 10, and that the invention can be practiced with any suitable flexible material.

Figure 2:
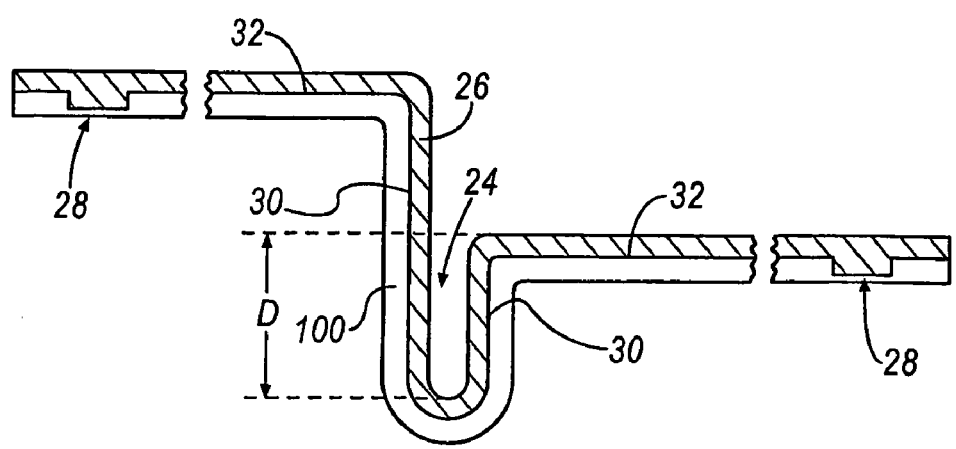
FIG. 2 is a cross-sectional view of a partially formed bolster assembly of FIG. 1 when a first nest is oriented in a closed position.

Referring now to FIG. 2, the bolster assembly 10 is partially formed by applying the base skin layer 26 on a first, lower nest 100. The base skin layer 26 may be formed on the first, lower nest 100 by spraying, casting, or male/female vacuum forming, or any suitable technique that is well-known in the art. The base skin layer 26 is applied to an outer surface 30 of the first, lower nest 100 that simulates the topography or profile of the door panel 12. A "2&4-way" locating scheme is integrally formed on base skin layer 26 and includes peripheral grooves or locating bosses 28 in the base skin layer 26 that may be pushed and axially locked into the door panel 12. Preferably, the locating bosses 28 are located at the outermost portion of the bolster assembly 10, and may be received in locators (not shown) on the door panel assembly 12. The locators may be selectively placed behind the handle bezel portion 14, the arm rest portion 16, or the additional armrest 18, each of which are generally located about the perimeter 22 of the bolster assembly 10. Once the base skin layer 26 is applied to the first, lower nest 100, the bolster skin layer 20 is cut to the approximate size such that the bolster skin layer 20 will cover the bolster region while being able to completely filling the groove 24.

One aspect of the invention is that the bolster assembly 10 is pre-applied in a nest or mold, which is generally similar to the profiles of the bolster region on the door panel assembly 12 where the bolster assembly 10 is located. The term "pre-applied" is generally directed to any operation that allows the remote formation or pre-shaping of the bolster assembly 10 before the complete manufacturing of the door panel 12. In general, the nest or mold generally comprises the first lower nest 100 that is similar to the profiles of the bolster region and a second, upper nest 101 for applying the bolster skin layer 20 to the base skin layer 26 in the first, lower nest 100.

Figure 3A:
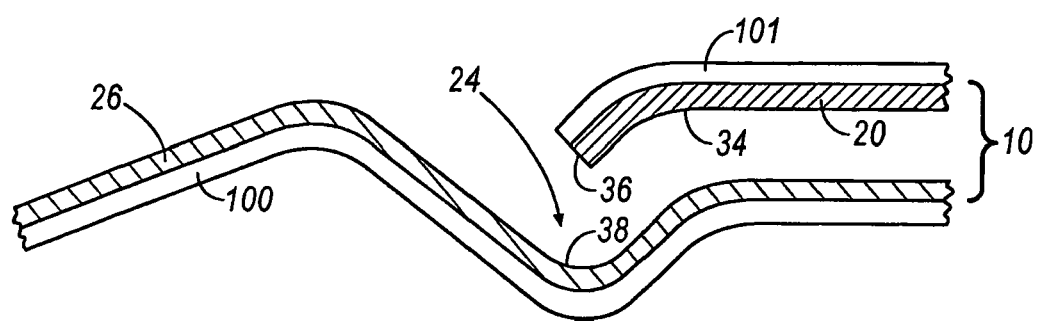
FIG. 3a is a cross-sectional view of the partially formed bolster assembly when the first nest is oriented in an open position.

Referring to FIG. 3a, the method of pre-applying the bolster assembly 10 is initiated by positioning the first, lower nest 100 in an open position to increase the accessibility of the groove 24. Opening the groove 24 prior to the complete formation of the bolster assembly 10 provides for a better fit and finish of the bolster assembly 10 by allowing the bolster assembly to completely fill the groove 24. Further, the orientation of the first nest 100 in the open position prevents the bolster skin layer 20 from sticking to the groove 24 of the base skin layer 26 until properly positioned within the groove 24. It should be realized that the base skin layer 26 can be applied to the first, lower nest 100 before or after being positioned in the open position.

The bolster skin layer 20 is applied on the second, upper nest 101. The bolster skin layer 20 can be applied before or after positioning the first, lower nest 100 in the open position. An adhesive material, such as a pressure-sensitive adhesive (PSA), PSA film, hot-melt, glue, or the like, may be applied to a surface 34 of the bolster skin layer 20 that will engage the base skin layer 26. It will be appreciated that the invention is not limited to the type of adhesive material and that the invention may be practiced with any type of suitable adhesive.

Figure 3B:
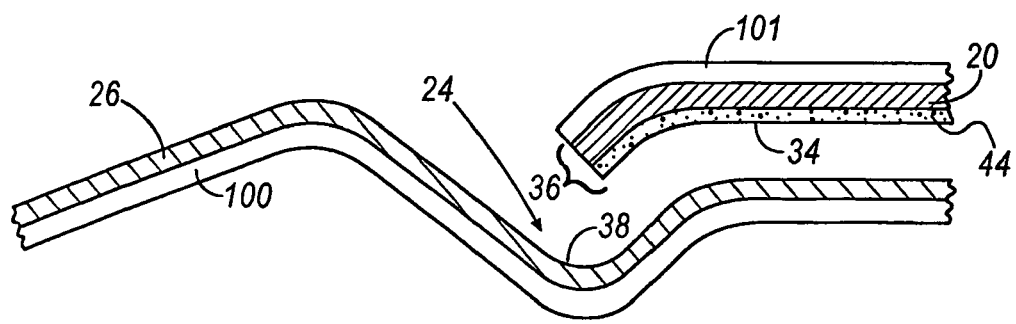
FIG. 3b is a cross-sectional view of the partially formed bolster assembly when the first nest is oriented in an open position according to an alternate embodiment of the invention.

There are many alternative embodiments for the bolster skin layer 20. Referring now to FIG. 3b, for example, a layer of foam material 44 may be formed on the side of the bolster skin layer 20 facing the base skin layer 26 according to an alternate embodiment of the invention. It is advisable to include the layer of foam material 44 because some shrinkage may occur over the life span of the bolster skin layer 20, particular if made of leather material. The layer of foam material 44 provides a tolerance for shrinkage of the leather material. In addition to providing a tolerance for the shrinkage of the bolster skin layer 20, the foam material 44 provides a variance for the softness level that may be selectively controlled by the manufacturer.

Figure 3C:
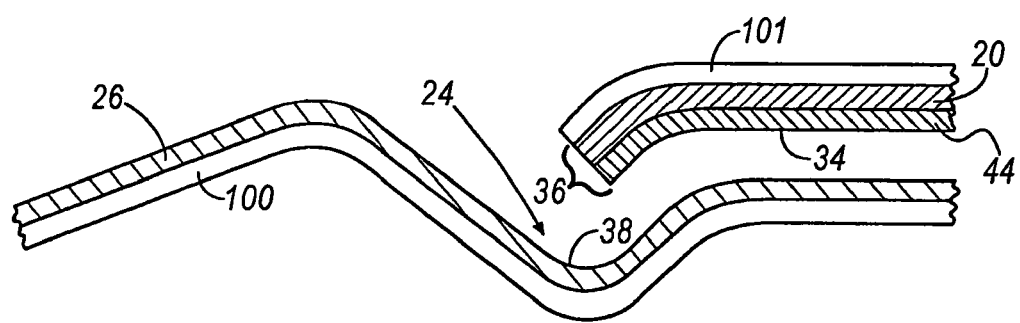
FIG. 3c is a cross-sectional view of the partially formed bolster assembly when the first nest is oriented in an open position according to another alternate embodiment of the invention.

Referring now to FIG. 3c, a thin film of flexible material 46 can be applied to the surface of the bolster skin layer 20 nearest the base skin layer 26 according to another example of the bolster skin layer 20 of the invention. The film of flexible material 46 may be injection-molded, sprayed, cast, or male/female vacuum formed on the bolster skin layer 20. The film of flexible material 46 may comprise a sprayed urethane or any flexible or elastomeric material, such as Thermoplastic Olefin (TPO), or the like.

Figure 3D:
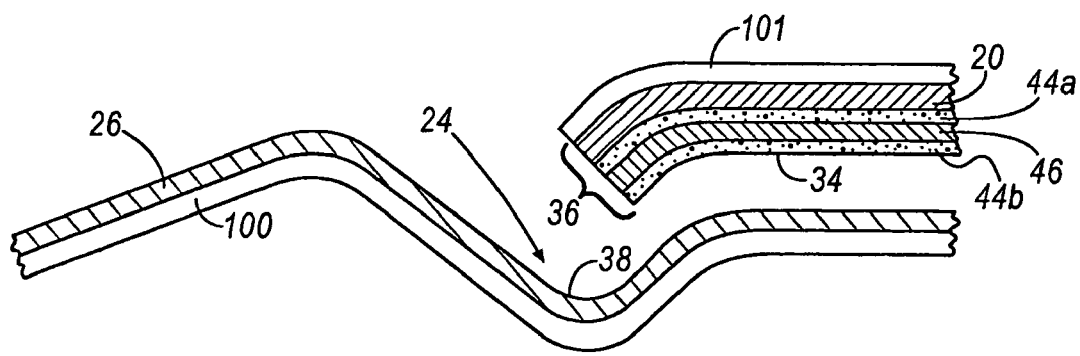
FIG. 3d is a cross-sectional view of the partially formed bolster assembly when the first nest is oriented in an open position according to yet another alternate embodiment of the invention.

Referring now to FIG. 3d, the thin film of flexible material 46 may be intermediately located between two layers of foam material 44a and 44b according to yet another example of the bolster skin layer 20 of the invention. The layer of foam material 44a may be applied to the bolster skin layer 20 by using a Foam-In-Place (FIP) operation, or the like. In each of the alternate embodiments shown in FIGS. 3b-3d, the adhesive material may be applied to the surface 34 of the bolster skin layer 20 that will engage the base skin layer 26. It should be appreciated that other examples for the bolster skin layer 20 are possible to one skilled in the art.

Referring back to FIG. 3a, the bolster skin layer 20 is then inserted into the groove 24 while the first nest 100 is in the open position. Because the first nest 100 remains in the open position when the bolster skin layer 20 is inserted, an edge 36 of the bolster skin layer 20 can be positioned approximately near to a bottom-most portion 38 of the groove 24. It will be appreciated that the positioning of the edge 36 near the bottom-most portion 38 of the groove 24 permits the general filling of the groove 24 by the bolster skin layer 20. The edge 36 may also be positioned near the bottom-most portion 38 so that a predetermined amount of spacing is provided therebetween. Referring back to FIG. 2, the groove 24 has a depth, D, to allow for locating variations of the bolster skin layer 20. If the bolster skin layer 20 comprises leather, the groove 24 must also allow enough tolerance for dimensional variations of the leather due to changes in environmental conditions, such as temperature, humidity, or the like. The tolerance should allow for variations in length of approximately 1-3 mm of the bolster skin layer 20.

Next, the bolster skin layer 20 is moved toward the base skin layer 26 by moving the second, upper nest 101 toward the first, lower nest 100 until the surface 34 engages the base skin layer 26. Once the bolster skin layer 20 is inserted into the groove 24, the pre-applying process is essentially completed. An adhesive material (not shown) may be applied to the surface 34 of the bolster skin layer 20. When the surface 34 engages the base skin layer 26, a continuous, light, and strong bond is provided that conforms to the topography of the bolster region in the door panel assembly 12. Once the bolster skin layer 20 is inserted into the groove 24 and engages the base skin layer 26, the second, upper nest 101 is moved away from the first, lower nest 100, which causes the detachment of the bolster skin layer 20 from the second, upper nest 101.

Figure 4:
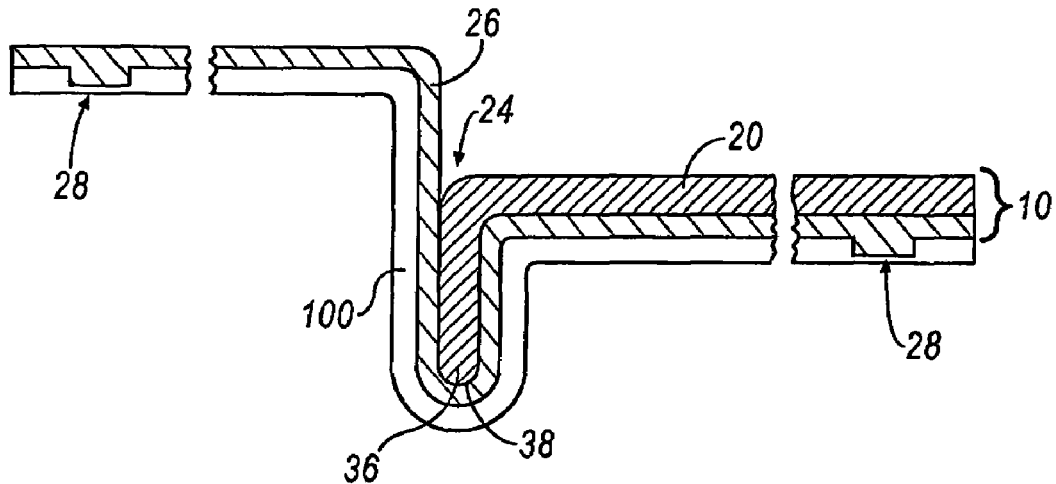
FIG. 4 is a cross-sectional view of the fully formed bolster assembly when the first nest is oriented in the position.

Referring to FIG. 4, once the bolster skin layer 20 is detached from the second, upper nest 101, the first, lower nest 100 is placed in the closed position, as shown in FIG. 2. It should be noted that moving the first, lower nest 100 to the closed position reduces the accessibility of the groove 24. However, because the accessibility of the groove 24 was increased when the first, lower nest 100 was in the open position, the bolster skin layer 20 can be positioned at the bottom-most portion 38 of the groove 24, thereby completely hiding the edge 36 from view of the occupant. Then, the completed bolster assembly 10 can be removed from the first, lower nest 100 by moving the first, lower nest 100 away from the bolster assembly 10.

Figure 5:
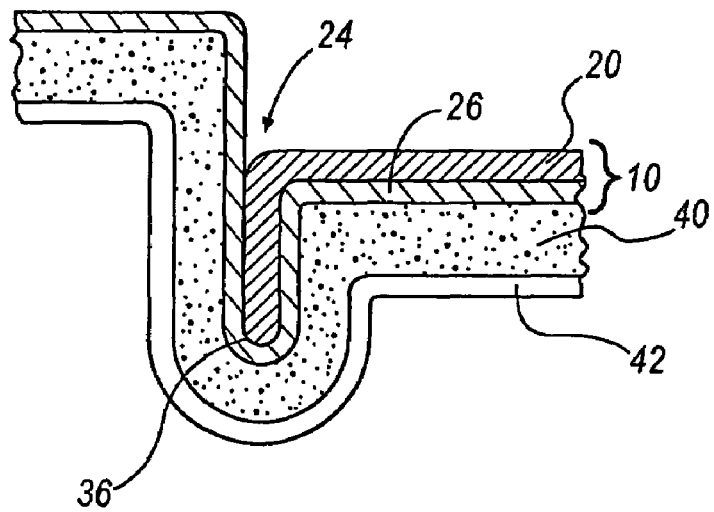
FIG. 5 is a cross-sectional view of the fully formed bolster assembly attached to the interior trim part after a foam-in-place (FIP) operation.

Referring now to FIG. 5, the bolster assembly 10 may be attached to the door panel assembly 12 by any one of a plurality of fastening means, for example, by a Foam-In-Place (FIP) operation, a Low-Pressure Molding (LPM) operation, and the like. Using a FIP operation, for example, a layer of foam material 40 can be intermediately located between a base skin layer 26 and an Acrylnitril-Butadien-Styrol-Copolymere (ABS) substrate layer 42. The layer of foam material 40 and the ABS substrate layer 42 may each have a thickness approximately equal to 3.0 mm and 2.0 mm, respectively. However, the foam layer 40 may have any desired thickness that enhances the softness of the bolster assembly 10, such as a thickness in the range of between about 3.00-6.00 mm. Using the LPM operation, for example, the foam layer 40 may be low pressure molded to the TPO material of the base skin layer 26 through the use of molten ABS material in the first nest 100.

The manufacturing process is completed by placing the bolster assembly 10 in the bolster region of the door panel 12 and performing a Foam-In-Place (FIP) operation. After a short time during the FIP operation, the foam material 40 begins to expand the groove 24. One advantage of pre-applying the bolster assembly 10 prior to the FIP operation is that the FIP operation causes extra pressure to be exerted on the bolster skin layer 20 of the bolster assembly 10. As a result, the groove 24 is further closed to more positively secure the bolster assembly 10 to the bottom-most portion 38 of the groove 24, as compared to conventional methods in which the bolster assembly is attempted to be inserted within the groove after a FIP or similar operation.

As described above, the present invention provides the ability to design and form a bolster assembly 10 in a controlled and consistent fashion, while reducing the amount of scrap material and parts during the manufacturing of an interior trim piece, such as the door panel 12. By pre-applying the bolster assembly 10 when the first nest 100 is in the open position, a more robust design of the bolster assembly 10 to account for profile designs of the bolster region of the door panel 12 can be achieved, as compared to conventional methods. In addition, if by chance the manufacturing of the bolster assembly 10 malfunctions during the pre-applying process, only the bolster assembly 10 is scraped, as compared to scraping the entire door panel assembly 12 as in conventional methods. Thus, the door panel assembly 12 can be subsequently formed by using a different, non-rejected bolster assembly, thereby resulting in a substantial cost savings to the manufacturer. Further, the bolster skin layer 20 can be positioned at the bottom-most portion 38 of the groove 24 when the bolster skin layer 20 is pre-applied to the base skin layer 26. As a result, a better fit and finish of the bolster skin layer 20 for the profiles of the bolster region is achieved using the pre-apply process of the invention.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A method of manufacturing a door panel assembly, comprising the steps of:
    orientating a first flexible nest to be in a closed position;
    depositing a base skin layer upon the first nest;
    defining the base skin layer to include a groove when the first nest is orientated in the closed position;
    increasing accessibility of the groove by flexibly manipulating the first nest from the closed position to an open position to thereby elongate the groove;
    depositing a bolster skin layer upon the base skin layer at least proximate the groove when the groove is elongated and in the first position; and
    following deposition of the bolster skin layer to the base skin layer, orientating the first nest from the open position to the closed position.

2. The method according to claim 1, wherein the depositing the bolster skin layer step further includes the step of
    inserting a leading edge of the bolster skin layer adjacent a bottom-most portion of the groove of the base skin layer when the first nest is orientated in the opened position.

3. The method according to claim 1, wherein, prior to the depositing the bolster skin layer step, further comprising the step of
    preparing the bolster skin layer upon a second nest by disposing the bolster skin layer upon the second nest; and, wherein, prior to the orientating the first nest from the open position to the closed position step, further comprising the step of
    detaching the bolster skin layer from the second nest.

4. The method according to claim 1 further including the step of
    removing the base skin layer including the deposited bolster skin layer from the first nest.

5. The method according to claim 4 further comprising the steps of
    providing a substrate layer;
    disposing the base skin layer proximate the substrate layer; and
    attaching the base skin layer to the substrate layer.

* * * * *